United States Patent Office 3,707,587
Patented Dec. 26, 1972

3,707,587
PROCESS FOR THE PREPARATION OF ORGANIC PHOSPHORUS COMPOUNDS
Reinhard Schliebs, Cologne-Flittard, Konrad Uhlig, Leverkusen, Gunter Oertel, Cologne-Flittard, and Hans-Joachim Diehr, Leverkusen, Germany, assignors to Farbenfabriken Bayer Aktiengesellschaft, Leverkusen, Germany
No Drawing. Filed Mar. 16, 1971, Ser. No. 124,932
Claims priority, application Germany, Apr. 14, 1970, P 20 17 812.5
Int. Cl. C07f 9/40
U.S. Cl. 260—970                    5 Claims

ABSTRACT OF THE DISCLOSURE

The invention relates to an improved process for the preparation of organic phosphorus compounds having free hydroxy groups and which are useful for the production of flame resistant polyurethane resins. Production of organic phosphorus compounds by reacting spirocyclic compounds with carbonyl compounds and alkanolamines and the utility thereof in the production of flame-resistant polyurethane resins.

---

It is known that in the production of polyurethane resins and especially of polyurethane foam resins the flame resistance of the end products can be increased by using starting components which contain phosphorus and/or halogen. Suitable phosphorus containing starting components for the production of polyurethane resins are, for example, compounds of the following general formula

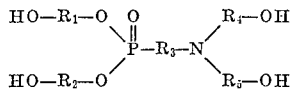

in which $R_1$ and $R_2$ are the same or different and represent alkylene or hydroxyalkylene radicals, $R_4$ and $R_5$ represent the same or different alkylene radicals and $R_3$ represents a substituted or an unsubstituted methylene radical. The synthesis of such phosphonic acid esters and their use in the production of flame-resistant polyurethane foam resins has been described in German patent specification 1,206,152, British patent specification 1,094,991 and French patent specification 1,496,359. According to the said patent specifications, these compounds may be prepared by reacting di-(ω-hydroxyalkyl) phosphites or polyalkoxy phosphites which contain terminal hydroxyl groups with aldehydes or ketones and dialkanolamines. The reaction products obtained by this process are dark in colour and relatively acid (see Examples 2, 2.1–2.3).

It is not surprising that the phosphonic esters obtained in this way are relatively acid. The hydroxyalkylphosphites required as starting materials may be prepared e.g. by reacting phosphorous acid with alkylene oxides or by ester inter change of dialkyl or diarylphosphites with glycols.

In the first of these cases, a considerable excess of alkylene oxide over the theoretical quantity of 2 mols of alkylene oxide/1 mol of phosphorous acid is required for obtaining a substantially neutral product. Between 4 and 6 mols of alkylene oxide should be allowed for each mol of phosphorous acid and even then the phosphorous acid ester obtained is not completely neutral.

Relatively high temperatures, e.g. 150° C., are required for the reaction of dialkyl or diarylphosphites with glycols (ester interchange). At these temperatures, decomposition reactions cannot be completely prevented and consequently the hydroxyalkyl phosphites obtained again are not completely neutral. Purification of these esters by distillation is not possible.

Moreover, in the subsequent reaction of the resulting hydroxyalkyl ester of phosphorous acid with the reaction product of Formalin solution and diethanolamine, partial hydrolysis of the hydroxyalkylester of phosphorous acid takes place in this alkaline medium (pH 8–9).

Now it is also known that the presence of acid components may lead to serious trouble in the production of polyurethane foam resins by the isocyanate polyaddition process.

The trouble may show itself e.g. in an increase in the setting time required for the foams, coarseness of the foam cells and severe deterioration in the mechanical properties and concomitant deterioration in the flame resistance.

It has now been found that hydroxyl and phosphorus containing compounds which correspond substantially to the above general formula and which are very pure and of low acidity can be obtained in practically quantitative yields by reacting spirocyclic compounds of the general formula

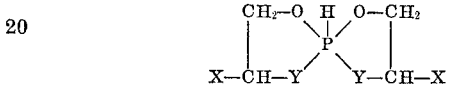

with carbonyl compounds of the general formula

and alkanolamines of the general formula

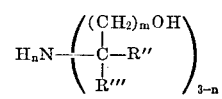

to produce compounds of the general formula

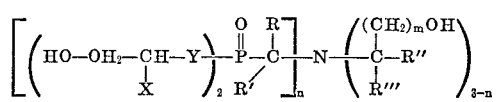

In these formulae, the variables X, Y, R, R', R'', R''', n and m have the meaning indicated below.

This invention therefore relates to a process for the preparations of organic phosphorus compounds of the general formula

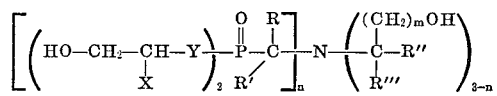

in which

X represents hydrogen or a methyl, chloromethyl or hydroxy methyl group,
Y represents oxygen or a >NR'''' group (R''''=H or $C_1$- to $C_4$-alkyl or $C_6$- to $C_9$-aryl),
R and R' may be the same or different and represent hydrogen, a $C_1$- to $C_4$-alkyl group or $C_6$- to $C_9$-aryl group,
n represents 1 or 2,
R'' represents hydrogen when $n=1$ and hydrogen or a hydroxymethyl group when $n=2$,
R''' represents hydrogen when $n=1$ and hydrogen, a $C_1$- to $C_4$-alkyl group or a hydroxymethyl group when $n=2$, and
m represents an integer of from 1 to 3, which comprises reacting compounds of the general formula

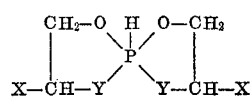

in which

X and Y have the meaning already indicated with carbonyl compounds of the general formula

in which

R and R' have the meaning already indicated and amines of the general formula

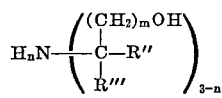

in which

R", R''', n and m have the meaning already indicated.

The principle of the reaction will now be explained with reference to the bis-β-hydroxyethyl ester of N,N-di-β-hydroxyethylaminomethane phosphonic acid as example.

The spirocyclic phosphorus Compound I is reacted with formaldehyde and diethanolamine to form the required end product II:

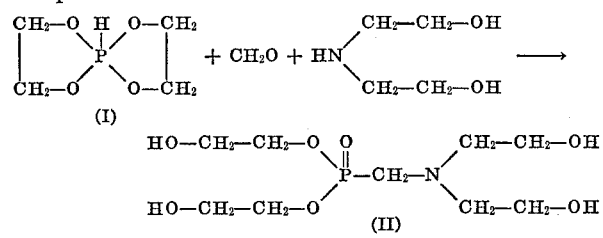

If the reaction is carried out using an alkanolamine which has a primary amino group, e.g. 2-aminopropane-1,3-diol, instead of diethanolamine, then hexafunctional compounds can be prepared in accordance with the following reaction scheme:

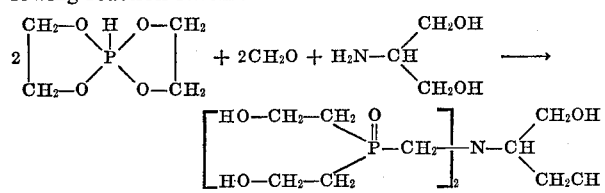

According to a particular embodiment of the process of the invention, the carbonyl compound may first be reacted with the amino alcohol in a first reaction stage to form a condensate which is then reacted with the spirocyclic phosphorus compound in a second reaction stage. The resulting reaction product is then converted into the required end product by hydrolysis.

The spirocyclic phosphorus compounds to be used in the process according to the invention may be prepared by known processes (Comptes Rendus des Séances de l'Académie des Sciences, série C, (1967), vol. 264, page 356) involving the reaction of 1 mol of trialkylphosphite, preferably trimethylpohsphite, with 2 mols of an alcohol which is at least dihydric or of an amino alcohol, in accordance with the following reaction scheme:

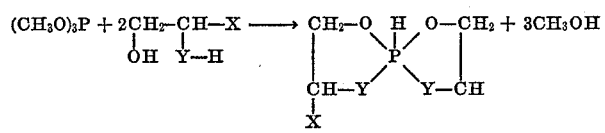

X=H, —CH$_3$, —CH$_2$Cl, —CH$_2$OH;
Y=—O—, —NR''''—(R''''=H, C$_1$— to C$_4$-alkyl, C$_6$- to C$_9$-aryl).

The spirocyclic phosphorus compounds used according to the invention are preferably those which can be prepared in accordance with the above equation from trimethylphosphite and aliphatic alcohols which are at least dihydric and which have adjacent hydroxyl groups and 2 to 3 carbon atoms. Examples of such compounds are ethylene glycol, propane-1,2-diol, 3-chloropropane-1,2-diol and glycerol. Suitable spirocyclic compounds for the process according to the invention are also those which can be obtained in accordance with the above equation from trimethylphosphite and amino alcohols. Examples of suitable amino alcohols are ethanolamine, N-methylethanolamine, N-butylethanolamine, N-phenylethanolamine, N-sym.-trimethylphenylethanolamine, 2 - aminopropanol-1, etc.

The following are examples of suitable carbonyl compounds for the process of the invention: Formaldehyde, polymers of formaldehyde, acetaldehyde, butyraldehyde, acetone, methyl ethyl ketone, methylisobutyl ketone, benzaldehyde, acetophenone, benzophenone, sym.-trimethylbenzaldehyde, etc., The carbonyl compounds preferably used for the process according to the invention are formaldehyde and polymers of formaldehyde such as paraformaldehyde.

The following are examples of amino alcohols which may be used for the process according to the invention: Ethanolamine, diethanolamine, dipropanolamine, dibutanolamine, 2-aminopropane-1,3-diol, 1-hydroxy-2-amino-4-hydroxybutane, tri-(hydroxymethyl)-methylamine, 1-hydroxy-2-amino-2-hydroxymethyl-propane, 1 - hydroxy-2-amino-2-hydroxymethyl-hexane, etc.

The amino-alcohols used for the process according to the invention are preferably diethanolamine and 2-aminopropane-1,3-diol.

The spirocyclic phosphorus compounds, carbonyl compounds and aminoalcohols are preferably used in equivalent quantities in the reaction according to the invention, and the reaction is carried out with stirring and cooling. Thus, for example, according to one method of carrying out the process of the invention, the spirocyclic phosphorus compound may be slowly added dropwise with stirring and cooling to a mixture of the carbonyl compound and amino alcohol. The reaction is completed when evolution of heat ceases.

According to another method of carrying out the process of the invention, a condensate is first prepared from the carbonyl compound and amino alcohol, optionally in an inert solvent such as benzene, toluene or xylene, the water of condensation being removed by azeotropic distillation. The spirocyclic phosphorus compound is then added gradually to the resulting condensate. The reaction product then obtained is then converted into the end product by hydrolysis by adding the calculated quantity of water.

In both methods of carrying out the process the reaction of spirocyclic phosphorus compound with carbonyl compound and amino alcohol or with the condensate formed from the carbonyl compound and amino alcohol is carried out at temperatures of between 0° C. and 120° C., preferably at temperatures between 30° C. and 60° C.

The organic phosphorus compounds prepared by the process according to the invention are very suitable for use as starting components for the production of flame-resistant polyurethane resins and especially foam resins by the polyisocyanate polyaddition process on account of their high functionality and low acid number.

EXAMPLE 1

1.1 Preparation of the spirans 1.1.1 Preparation of Spiran A.

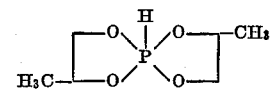

1 litre of toluene and 1520 g. (20 mol) of anhydrous propylene glycol-1,2 are introduced into a 4-litre threenecked flask equipped with distillation column, reflux divider, dropping funnel and thermometer.

The two-phase mixture is heated to the boiling point of toluene, and 1300 g. (10.5 mol) of trimethylphosphite are slowly added from the dropping funnel. Shortly after the addition of trimethylphosphite is started the temperature on the reflux divider drops to 64° C. The rate at which the temperature drops is adjusted so that practically pure methanol can be removed. The removal of methanol is completed shortly after all the trimethylphosphite has been added (approximately 4 hours).

Toluene is then driven off at reduced pressures (finally 5 mm. Hg). The sump temperature does not rise above 125° C. during this time. The reisdue weighs 1802 g. (theoretical: 1800 g.). The infra-red spectrum shows a strong pH band; there are no OH bands.

1.1.2  1365 g. of the crystalline Spiran B

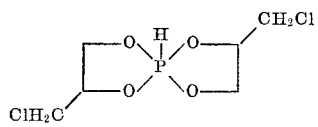

are obtained in an analogous manner from 1120 g. of ethylene glycol (18 mol), 1120 g. of trimethylphosphite (9 mol) and 1000 ml. of toluene.

1.1.3  2485 g. of Spiran C

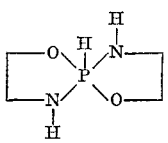

are prepared in accordance with Example 1.1.1 from 2210 g. of 3-chloro-propane-1,2-diol, 1300 g. of trimethylphosphite (approximately 5% excess) and 2 litres of toluene.

1.4.  1185 g. (theoretical: 1240 g.) of Spiran D

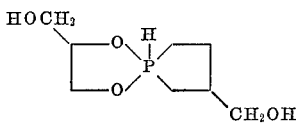

(melting point approximately 90° C. to 95° C.) were obtained by the method of Example 1.1.1 from 1000 g. of ethanolamine and 1070 g. of trimethylphosphite in 1 litre of toluene. The reaction was approximately 5 times slower than in Examples 1.1.1 to 1.1.3.

1.1.5  420 g. (theoretical: 424 g.) of Spiran E

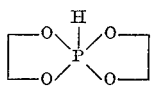

were obtained by the method of Example 1.1.1 from 364 g. of glycerol and 248 g. of trimethylphosphite in the presence of 1 litre of toluene.

1.2  Preparation of the polyols which contain phosphorus 1.2.1  3-stage process 1.2.1.1  The two-phasic mixture of 32 g. of paraformaldehyde, 105 g. of diethanolamine and 500 ml. of toluene was heated in a 1 litre flask with attached column and water separator until the water separator contained 18 ml. of water. The reaction mixture in the flask was then one-phase.

1.2.1.2  1 mol (180 g.) of Spiran A obtained according to Example 1.1.1 was added to the reaction mixture obtained according to 1.2.1.1. Spiran F was obtained in a moderately exothermic reaction; it remained behind as a colourless, viscous liquid after the toluene had been driven off.

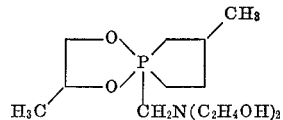

It was identified by complete analysis, NMR spectrum and IR spectrum (no pH vibrations and no P=O vibrations in the IR spectrum).

1.2.1.3  18 ml. of water were added to the spiran obtained according to 1.2.1.2. The end product of the invention, Compound G which consists of the bis-(hydroxyisopropyl) ester of bis-(hydroxyethyl)-aminomethanephosphonic acid, was obtained in quantitative yield as a pale yellowish, viscous, non-acid oil in a strongly exothermic reaction involving ring opening.

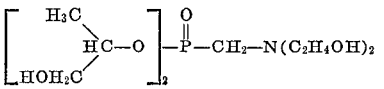

1.2.1.4  Bis-(hydroxyethyl) ester of bis-(hydroxyethyl)-aminomethanephosphonic acid and bis-[2-(chloromethyl) - 2 - hydroxyethyl] ester of bis-(hydroxyethyl)-methane phosphonic acid were obtained in an analogous manner as light coloured, viscous, non-acid oils from Spirans B and C and the condensation product of Formalin and diethanolamine and subsequent addition of water.

1.2.1.5  β - aminoethyl ester of bis - (hydroxyethyl)-aminomethanephosphonic acid is obtained from Spiran D and the condensation product of Formalin and diethanolamine. Here again the yield is quantitative.

1.2.1.6  Compound H, consisting of bis-1(-hydroxymethyl - 2 - hydroxyethyl) ester of bis-(hydroxyethyl)-aminoethane phosphonic acid, is obtained in practically quantitative yield as a very viscous liquid from Spiran E and the condensation product of Formalin and diethanolamine by the method described above. The product is practically neutral.

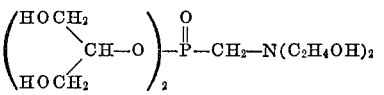

1.2.1.7  2 mols (=360 g.) of Spiran A were added to the condensation product obtained from 1 mol (105 g.) of 2-amino-2-methylpropane-1,3-diol and 2 mols of paraformaldehyde by azeotropic removal of water, and 2 mols of water were added when all the Spiran A had been added. Phosphonic acid ester I remained behind in quantitative yield. The product is practically neutral.

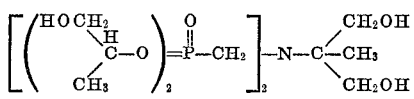

1.2.1.8  Phosphonic acid ester J was obtained in analogous manner from the condensation products described in 1.2.1.7 and Spiran C. The product is practically neutral.

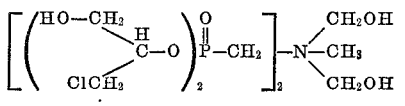

1.2.2  Single stage process 1.2.2.1  1000 g. of Spiran C were added slowly with stirring and cooling (reaction temperature approximately 50° C. to 60° C.) to a mixture of 130 g. of paraformaldehyde and 430 g. of diethanolamine. Bis-[2-(chloromethyl) - 2 - hydroxyethyl] ester of bis-(hydroxyethyl)-amino-methanephosphonic acid, which is similar to the product prepared according to 1.2.1.4 although slightly deeper in colour is obtained in practically quantitative yield.

1.2.2.2 320 g. of paraformaldehyde and 1050 g. of diethanolamine are heated until a practically homogeneous mixture is obtained. The mixture is introduced into a dropping funnel mounted on a 4-litre flask which is also equipped with another dropping funnel, a thermometer, a stirrer and means for external cooling. 1800 g. of Spiran A are introduced into the second dropping funnel. Equivalent quantities are run into the reaction flask simultaneously from both dropping funnels and the reaction temperature is maintained at 50 to 60° C. by external cooling. The resulting phosphonic acid ester F is similar to the preparation obtained according to 1.2.1.3 only slightly deeper in colour.

EXAMPLE 2

2. Comparison test, preparation of a compound having the following general formula already mentioned above $$\begin{array}{c} HO-R_1-O \quad\quad O \quad\quad R_4-OH \\ \diagdown \;\;\;\; \| \;\;\; \diagup \\ P-R_3-N \\ \diagup \;\;\;\; \;\;\; \diagdown \\ HO-R_2-O \quad\quad\quad R_5-OH \end{array}$$

by known processes.

2.1 Preparation of a bis-(hydroxyalkyl) phosphite.

2 mols (164 g.) of crystalline phosphorous acid were reacted with propylene oxide (total 464 g., corresponding to 8 mols) at 40 to 50° C. with stirring and cooling. When the exothermic reaction had subsided, 1 g. of the phosphorous acid ester used up 1.8 ml. of N/10 alkaline solution.

2.2 180 g. of a Formalin solution having a concentration of 33.5% by weight were added to 120 g. of diethanolamine at such a rate that the temperature did not exceed 30° C.

2.3 The hydroxyalkyl phosphorus acid ester prepared according to 2.1 was added to the condensation product prepared according to 2.2 at 25° C. The reaction mixture was then kept at 50° C. for ½ hour and finally water was driven off at 5 mm. Hg at a temperature of up to 95° C. The reaction product was dark brown and had an acid number of 91.

EXAMPLE 3

3. Preparation of a flame resistant polyurethane foam resin.

3.1 Application of a phosphonic acid ester prepared by the process according to the invention.

20 parts of weight of phosphonic acid ester G prepared according to Example 1.2.1.3, 3 parts by weight of permethylated N-β-aminoethylpiperazine (catalyst), 1 part by weight of polysiloxane polyether copolymer (stabilizer) and 40 parts by weight of diphenylmethane-4,4'-diisocyanate were added to 80 parts by weight of a polyether based on sucrose and propylene oxide of hydroxyl number 380. The whole reaction mixture is then mixed for about 20 to 30 seconds in an electric mixer and poured out into paper moulds. A tough, finely porous hard foam resin is obtained after 2 to 3 minutes. The foam has a heat bending resistance of 145° C. and is completely dimensionally stable and self extinguishing.

3.2 Application of the phosphonic acid ester prepared by known processes in Example 2.

Phosphonic acid ester G given in the formulation in Example 3.1 was replaced by the phosphonic acid ester prepared in comparison test 2. The following differences were found:

The setting time of the foam was greatly increased (over (30%).

The cellularity of the foam was coarse and uneven.
The heat bending resistance was reduced (110° C.).
A poorer result was obtained in the torch test.
The foam was not dimensionally stable.

What is claimed is:

1. A process for preparing a compound of the formula $$\left[\left(HO-CH_2-CH-Y-\underset{X}{\underset{|}{\overset{O}{\overset{\|}{P}}}}-\underset{R'}{\underset{|}{\overset{R}{\overset{|}{C}}}}-N\right)_2\right]_n \left(\underset{R'''}{\underset{|}{\overset{(CH_2)_mOH}{\overset{|}{C}}}}-R''\right)_{3-n}$$

wherein X is hydrogen, methyl, chloromethyl or hydroxymethyl, Y is oxygen or NR'''' wherein R'''' is hydrogen, alkyl having 1 to 4 carbon atoms or aryl having 6 to 9 carbon atoms, R and R' are each hydrogen, alkyl having 1 to 4 carbon atoms or aryl having 6 to 9 carbon atoms, n is 1 or 2, R'' is hydrogen when n is 1 and hydrogen or hydroxymethyl when n is 2, R''' is hydrogen when n is 1 and hydrogen, alkyl having 1 to 4 carbon atoms or hydroxymethyl when n is 2 and m is an integer of from 1 to 3, said process comprising reacting equivalent amounts of an organic phosphorus compound of the formula $$\begin{array}{c} CH_2-O \quad H \quad O-CH_2 \\ \;\;\;\;\;\;\diagdown \;\;\;| \;\;\diagup \\ \;\;\;\;\;\;\;\;\;\;P \\ \;\;\;\;\;\;\diagup \;\;\;\;\;\;\diagdown \\ X-CH-Y \quad\quad Y-CH-X \end{array}$$

wherein X and Y are as aforesaid with a carbonyl compound of the formula $$\begin{array}{c} R \\ | \\ C=O \\ | \\ R' \end{array}$$

wherein R and R' are as aforesaid and an amine of the formula $$H_nN-\left(\underset{R'''}{\underset{|}{\overset{(CH_2)_mOH}{\overset{|}{C}}}}-R''\right)_{3-n}$$

wherein R'', R''', n and m are as aforesaid at a temperature of from 0 to 120° C.

2. The process of claim 1 wherein said carbonyl compound and said amine are reacted in a first reaction stage, the reaction product thereof is reacted with said organic phosphorus compound in a second reaction stage and the latter reaction product is hydrolyzed to obtain the desired product.

3. The process of claim 1 wherein the carbonyl compound is formaldehyde or a polymer thereof.

4. The process of claim 1 wherein said amine is diethanolamine.

5. The process of claim 1 wherein said amine is 2-aminopropane-1,3-diol.

References Cited
UNITED STATES PATENTS

| | | | |
|---|---|---|---|
| 3,555,124 | 1/1971 | Beck et al. | 260—970 |
| 3,539,536 | 11/1970 | Price | 260—970 X |
| 3,076,010 | 1/1963 | Beck et al. | 260—970 X |

LEWIS GOTTS, Primary Examiner

R. L. RAYMOND, Assistant Examiner

U.S. Cl. X.R.

260—77.5 AQ, 584 R, 932, 936, 937, 944, 945, 984